United States Patent
Wessel (10) Patent No.: US 9,091,828 B2
(45) Date of Patent: Jul. 28, 2015

(54) METHOD AND APPARATUS FOR ALIGNING A LASER TO A WAVEGUIDE

(71) Applicant: Seagate Technology LLC, Cupertino, CA (US)

(72) Inventor: James Gary Wessel, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/525,422

(22) Filed: Oct. 28, 2014

(65) Prior Publication Data

US 2015/0041523 A1    Feb. 12, 2015

Related U.S. Application Data

(62) Division of application No. 13/687,435, filed on Nov. 28, 2012, now Pat. No. 8,873,903.

(51) Int. Cl.
| | |
|---|---|
| G02B 6/12 | (2006.01) |
| G11B 5/60 | (2006.01) |
| G11B 11/00 | (2006.01) |
| G02B 6/42 | (2006.01) |
| G11B 5/105 | (2006.01) |
| B23K 1/00 | (2006.01) |
| B23K 1/20 | (2006.01) |

(Continued)

(52) U.S. Cl.
CPC ............ *G02B 6/4245* (2013.01); *B23K 1/0016* (2013.01); *B23K 1/20* (2013.01); *G02B 6/4232* (2013.01); *G11B 5/105* (2013.01); *G02B 6/3652* (2013.01); *G02B 6/423* (2013.01); *G02B 6/4231* (2013.01); *G02B 6/4233* (2013.01); *G02B 6/4234* (2013.01); *G02B 6/4236* (2013.01); *G02B 6/4238* (2013.01); *G11B 5/6088* (2013.01); *G11B 2005/0021* (2013.01)

(58) Field of Classification Search
CPC .... G02B 6/4234; G02B 6/3652; G02B 6/423; G02B 6/4231; G02B 6/105; G02B 6/4236; G02B 6/4233; G02B 6/4245; G02B 6/4232; G02B 6/4238; G11B 5/6088
USPC .................. 385/14–15, 25; 360/234.3, 237.1, 360/246.2; 369/13.01–13.56
See application file for complete search history.

(56) References Cited

U.S. PATENT DOCUMENTS 6,643,434 B2 * 11/2003 Cayrefourcq et al. .......... 385/52
7,303,339 B2 * 12/2007 Zhou et al. ...................... 385/91

(Continued)

FOREIGN PATENT DOCUMENTS

WO    WO02065600    8/2002

OTHER PUBLICATIONS

File History for U.S. Appl. No. 13/687,435.

*Primary Examiner* — Ryan Lepisto
*Assistant Examiner* — Guy Anderson
(74) *Attorney, Agent, or Firm* — Hollingsworth Davis, LLC (57) ABSTRACT

An apparatus includes a slider structure having a waveguide and a cavity configured to align a laser to the waveguide. The cavity includes a plurality of solder bumps on a bottom of the cavity configured to electrically and thermally couple the laser to the slider. At least one mechanical stopper is disposed in the cavity to facilitate vertical alignment between an output of the laser and an input of the waveguide. At least one solder bump is disposed on the mechanical stopper to facilitate lateral alignment between the output of the laser and the input of the waveguide in response to a reflow of the solder bumps.

17 Claims, 7 Drawing Sheets

(51) Int. Cl.
  *G02B 6/36* (2006.01)
  *G11B 5/00* (2006.01)

(56) References Cited

U.S. PATENT DOCUMENTS

| | | | |
|---|---|---|---|
| 8,230,589 B2* | 7/2012 | Lu et al. | 29/840 |
| 8,274,867 B2* | 9/2012 | Mori et al. | 369/13.33 |
| 8,345,517 B2* | 1/2013 | Hurley et al. | 369/13.32 |
| 8,416,646 B2* | 4/2013 | Huang et al. | 369/13.01 |
| 8,424,191 B2* | 4/2013 | Shimazawa et al. | 29/603.1 |
| 2005/0089264 A1 | 4/2005 | Johnson et al. | |
| 2009/0244873 A1* | 10/2009 | Lu et al. | 361/808 |
| 2009/0262448 A1* | 10/2009 | Shimazawa et al. | 360/59 |
| 2009/0266789 A1* | 10/2009 | Shimazawa et al. | 216/22 |
| 2011/0157738 A1* | 6/2011 | Shimazawa et al. | 360/59 |
| 2011/0242697 A1* | 10/2011 | Mori et al. | 360/59 |
| 2011/0266469 A1* | 11/2011 | Goulakov et al. | 250/505.1 |
| 2011/0267930 A1* | 11/2011 | Hurley et al. | 369/13.32 |
| 2012/0099407 A1* | 4/2012 | Hipwell et al. | 369/13.32 |
| 2013/0053730 A1* | 2/2013 | Kotlanka et al. | 600/585 |
| 2013/0277863 A1* | 10/2013 | Zhong et al. | 257/779 |
| 2013/0279311 A1* | 10/2013 | Hurley et al. | 369/13.02 |
| 2014/0091130 A1* | 4/2014 | Hipwell et al. | 228/176 |
| 2014/0147075 A1* | 5/2014 | Wessel | 385/14 |

* cited by examiner

METHOD AND APPARATUS FOR ALIGNING A LASER TO A WAVEGUIDE

CROSS-REFERENCE TO RELATED APPLICATIONS

This application is a divisional of U.S. Ser. No. 13/687,435, filed Nov. 28, 2012, which is incorporated herein by reference in its entirety.

SUMMARY

Various embodiments described herein are generally directed to methods, systems, and apparatuses that facilitate aligning a laser to a waveguide on a slider structure. In one embodiment, an apparatus comprises a laser and a slider including a waveguide and a cavity configured to align the laser to the waveguide. The cavity includes a plurality of solder bumps on a bottom of the cavity configured to electrically and thermally couple the laser to the slider. At least one mechanical stopper is disposed in the cavity to facilitate vertical alignment between an output of the laser and an input of the waveguide. At least one solder bump is disposed on the mechanical stopper to facilitate lateral alignment between the output of the laser and the input of the waveguide in response to a reflow of the solder bumps.

In another embodiment, an apparatus comprises a laser and a slider including a waveguide and a cavity configured to align the laser to the waveguide. The cavity includes a first plurality of solder bumps on a bottom of the cavity configured to electrically couple the laser to the slider, and a second plurality of solder bumps disposed on the first plurality of solder bumps. The second plurality of solder bumps has a lower melting point than the first plurality of solder bumps. A reflow of the second plurality of solder bumps facilitates lateral alignment of an output of the laser to an input of the waveguide. At least one mechanical stopper is disposed in the cavity to facilitate vertical alignment of the output of the laser to the input of the waveguide in response to a reflow of the first and second plurality of solder bumps.

In another embodiment, a method for aligning a laser to a waveguide on a slider involves forming a cavity on a slider including a waveguide. The cavity comprises at least one mechanical stopper, a first plurality of solder bumps, and at least one second solder bump. The laser is positioned on at least the second solder bump. The slider is reflowed to align an output of the laser to an input of the waveguide. The first plurality of solder bumps facilitates a vertical alignment between the cavity and the laser during the reflow, and the second solder bump facilitates a lateral alignment between the cavity and the laser during the reflow.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

In the figures, like reference numerals may be used to designate like elements.

DETAILED DESCRIPTION

The present disclosure is generally directed to recording heads used in magnetic recording devices such as hard drives. In particular, this disclosure relates to heat assisted magnetic recording (HAMR), which is one technique used to increase areal data density of magnetic media. HAMR generally refers to the concept of temporarily and locally heating a recording media to reduce the coercivity of the media so that an applied magnetic writing field can more easily direct the magnetization of the media during the temporary magnetic softening of the media caused by the heat source. A tightly confined, high power laser light spot can be used to heat a portion of the recording media. Then the heated portion is subjected to a magnetic field that sets the direction of magnetization of the heated portion. This approach to magnetic recording may also be referred to by other names, as thermal assisted magnetic recording (TAMR). Also, similar approaches may be used in other types of data recording, such as in magneto-optical (MO) systems.

In a HAMR device, optical guiding and focusing elements may be integrated in a recording head (also referred to as a "slider") to couple the output of a laser light to the recording location and confine the laser light to a small spot on the media. One method of coupling laser light into these optical elements is to include a laser on the recording head itself and direct the laser output into an input of a waveguide on the recording head. The waveguide transmits the light to a location adjacent to an air bearing surface (ABS) of the slider, and from this location the light is directed to the recording media.

Active alignment can be used to achieve the alignment between the laser and the waveguide. Active alignment involves positioning the laser proximate to the waveguide with the laser output on and monitoring the coupled laser power while moving the laser to final position, after which the laser is attached (e.g., soldered) in place. Active alignment may be prohibitively expensive for mass production of hard drives and other devices. An alternative to active alignment is passive alignment method, which involves alignment and attachment with the laser off. In the embodiments, discussed below, apparatuses and methods are described to facilitate accurate passive alignment of a laser with a slider-integrated waveguide.

In the disclosed embodiments, a mechanical stopper may be deployed in a cavity of the slider to facilitate vertical alignment between the laser and the waveguide. But friction or adhesion on the mechanical stopper may create shear forces that prevent proper lateral alignment. The embodiments described below include features that provide increased coupling efficiency by improving the three dimensional alignment of the laser to the waveguide. The benefits for improving the alignment include better slider yield and higher reliability of the laser. HAMR writing requires a certain minimum amount of light to reach the ABS. Installing a poorly aligned laser would result in the recording head to be scrapped. Better alignment allows lasers to run at lower current thereby improving laser reliability.

Figure 1A:
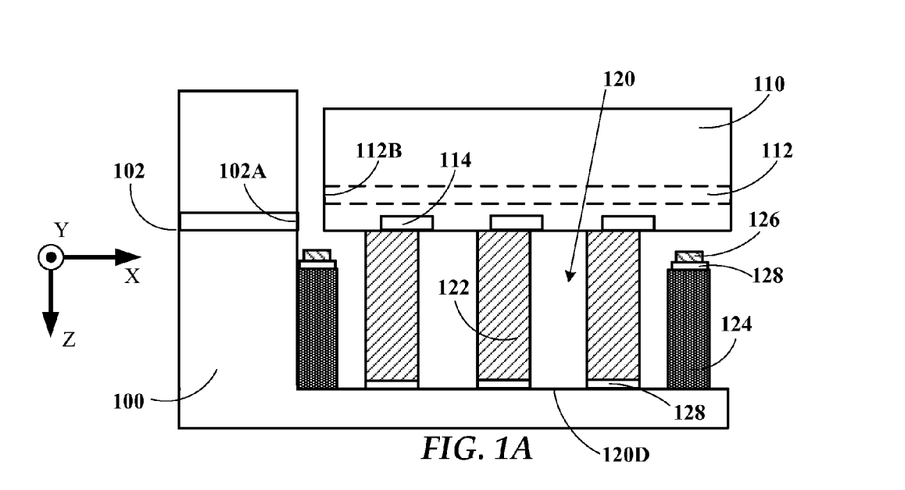
FIGS. 1A-1C are cross-sectional views of a laser and a slider including a waveguide and a cavity configured to align the laser to the waveguide according to an example embodiment.
Figure 1B:
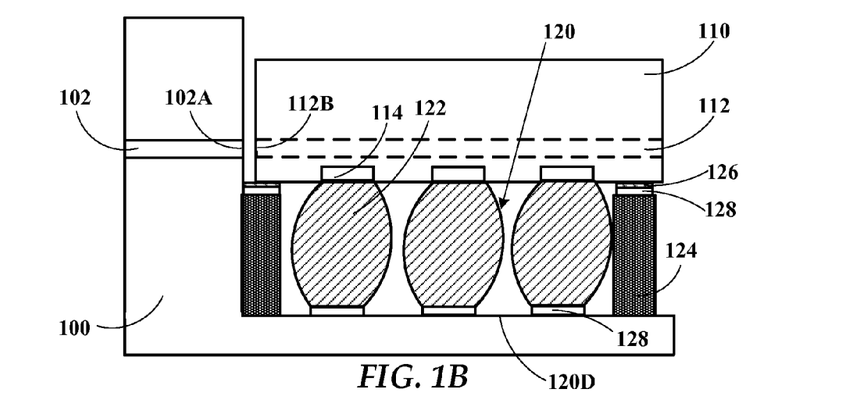
Figure 1C:
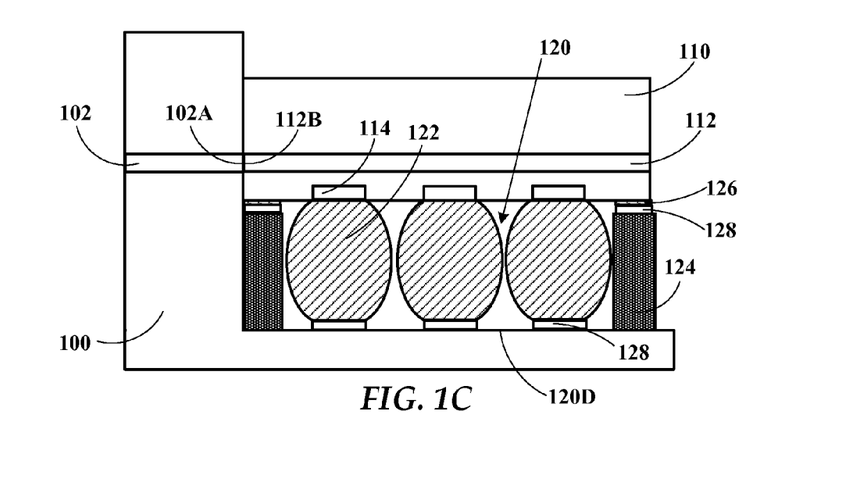

FIGS. 1A-1C are cross-sectional views of a laser and a slider including a waveguide and a cavity configured to align the laser to the waveguide according to an example embodiment. Referring to FIG. 1A, the slider 100 includes a waveguide 102, and a cavity 120. A laser 110 includes a laser light channel 112, and is positioned in the cavity 120 to align an output 112B of the laser light channel 112 into an input facet 102A of the waveguide 102. The cavity 120 includes a plurality of solder bumps 122 on a bottom 120D of the cavity 120 configured to electrically and thermally couple the laser 110 to the slider 100. The cavity 120 further includes at least one mechanical stopper 124 disposed in the cavity 120 that facilitates vertical alignment between the output 112B of the laser and the input facet 102A of the waveguide 102.

The cavity 120 further includes at least one solder bump 126 disposed on the mechanical stopper 124, wherein the at least one solder bump 126 facilitates lateral alignment between the output 112B of the laser light channel 112 and the input facet 102A of the waveguide 102 in response to a reflow of the solder bumps 122 and 126. The material of solder bumps 122 may or may not be same as the material of solder bump 126. Under bump metallization (UBM) 128 is disposed under the at least one solder bump 126 and under the solder bumps 122. The UBM 128 is configured to provide a strong, low-stress mechanical and electrical connection between the solder bumps 122 and the mechanical stopper 124. The UBM 128 can also limit the diffusion of solder bumps 126 and 122 into the underlying material and prevent oxidation of the underlying material. Additionally, the UBM 128 limits the lateral movement of the solder bumps 126 and 122 during reflow. The laser 110 further includes laser contacts 114 configured to contact the solder bumps 122.

As illustrated in FIG. 1A, the laser 110 is positioned in the cavity 120, on top of the plurality of solder bumps 122. During a reflow of the solder bumps 122 and 126, the mechanical stoppers 124 facilitate vertical (Z direction) alignment between the output 112B of the laser 110 and the waveguide input facet 102A, as shown in FIG. 1B. In accordance with FIG. 1C, at least one solder bump 126 disposed on the mechanical stopper 124 facilitates lateral (X and Y directions) alignment between the output 112B of the laser 110 and the waveguide input facet 102A by reducing friction on the mechanical stopper 124, in response to the reflow. The shear modulus drops close to zero on materials above the melting temperature during reflow. A surface tension of the plurality 126 of solder bumps provides lateral alignment between the output 112B of the laser 110 and the waveguide input facet 102A in response to the reflow. The mechanical stoppers 124 serve as Z-stop. According to various embodiments, the mechanical stoppers 124 comprise at least one member that does not electrically couple the laser 110 to the slider 100 after the reflow of the solder bumps. According to various embodiments, the laser output 112B is aligned with the waveguide input facet 102A using passive alignment, without turning on the laser.

Figure 2A:
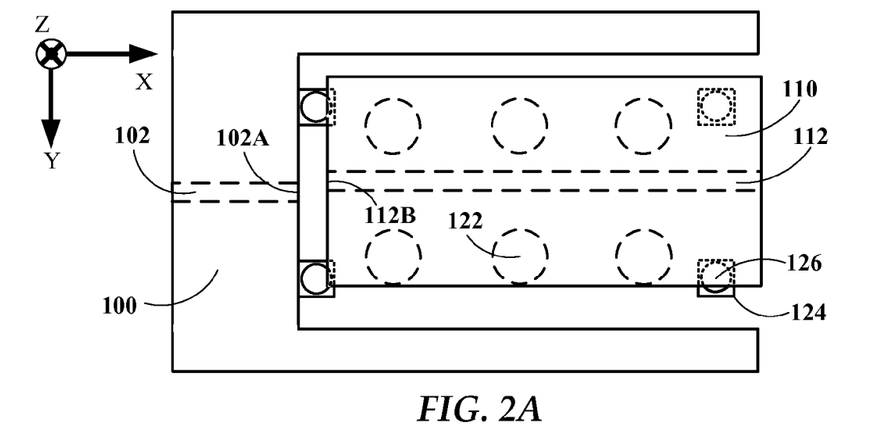
FIGS. 2A-2C are top views of a laser and a slider including a waveguide and a cavity configured to align the laser to the waveguide according to an example embodiment.
Figure 2B:
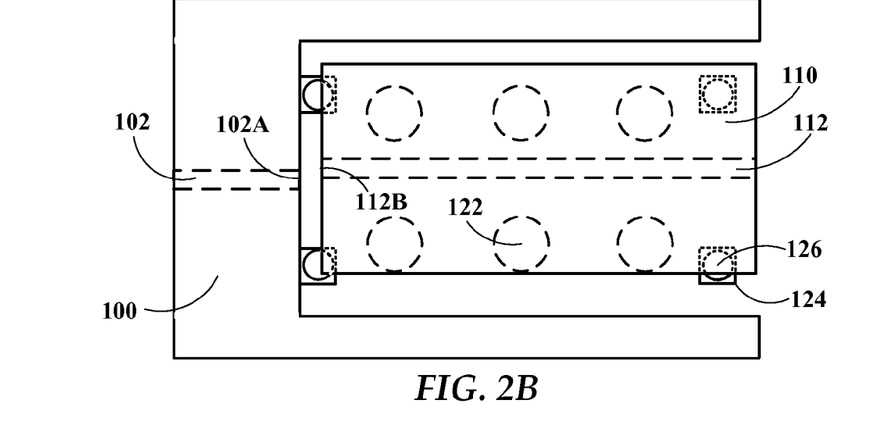
Figure 2C:
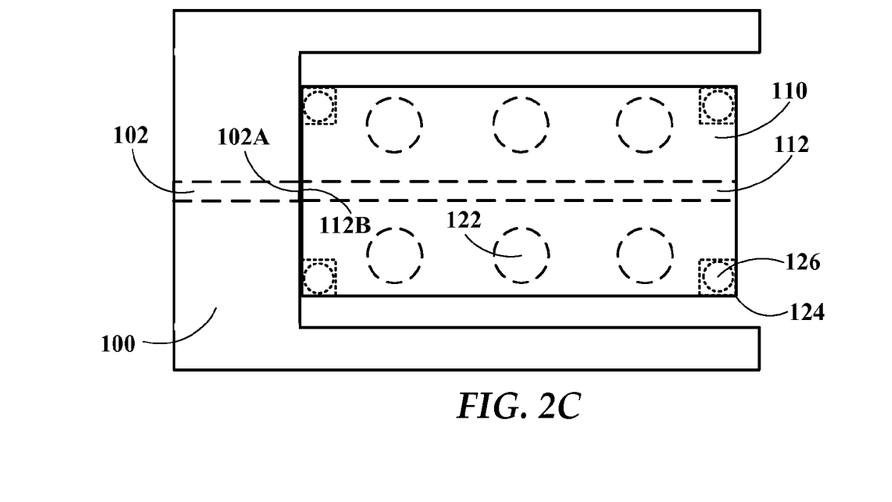

FIGS. 2A-2C are top views of a laser and a slider including a waveguide and a cavity configured to align the laser to the waveguide according to various embodiments. FIG. 2A shows a top view of the embodiment in accordance with FIG. 1A, FIG. 2B shows a top view of the embodiment in accordance with FIG. 1B, and FIG. 2C shows a top view of the embodiment in accordance with FIG. 1C. In FIGS. 1A-1C and 2A-2C, like reference numerals designate like elements. Dashed lines in FIGS. 1A-1C and 2A-2C refer to the portions of elements cannot be seen from the corresponding direction in reality.

FIG. 2A shows that the laser 110 is not aligned with the waveguide 102 before reflow. According to various embodiments, FIG. 2B shows the slider during reflow and FIG. 2C shows the slider after reflow. As illustrated in FIG. 2C, the output 112B of the laser light channel 112 has been aligned with the input 102A of the waveguide 102 after reflow, laterally in X and Y directions. The Z direction alignment after reflow can be better seen in FIG. 1C.

Figure 3A:
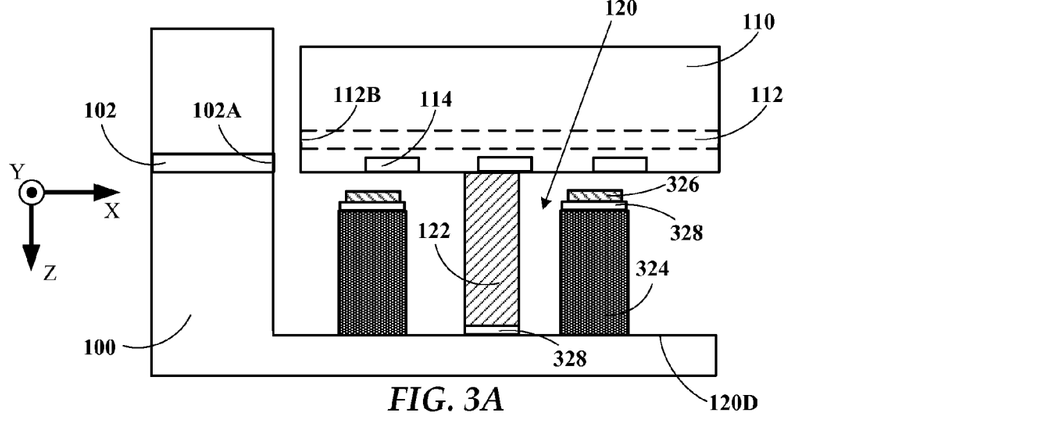
FIGS. 3A-3C are cross-sectional views of a laser and a slider including a waveguide and a cavity configured to align the laser to the waveguide according to another example embodiment.
Figure 3B:
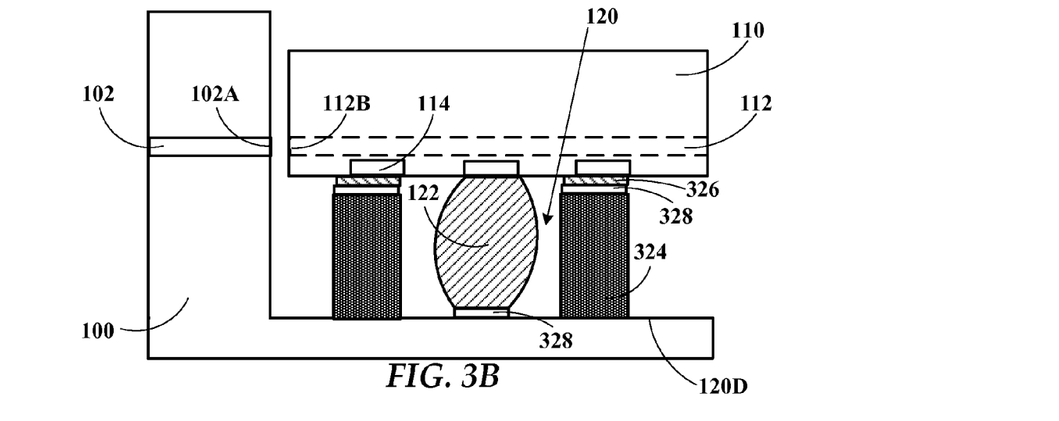
Figure 3C:
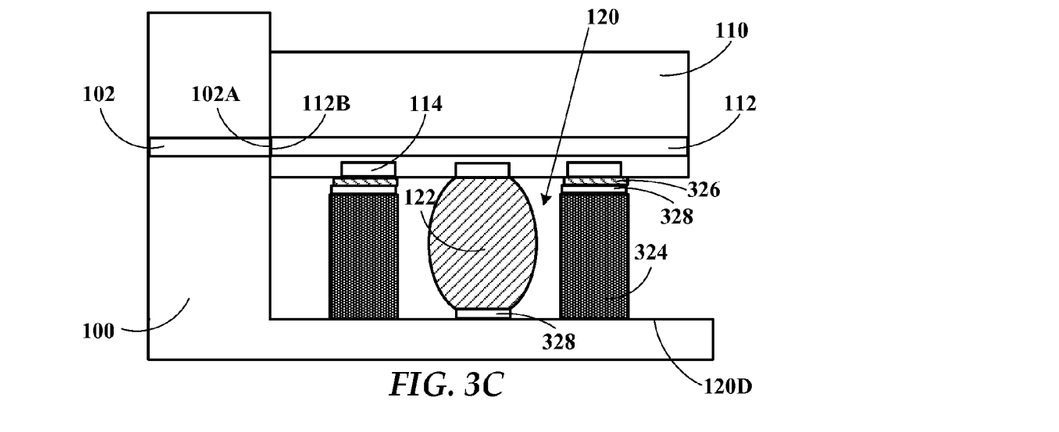

According to another example embodiment illustrated in FIGS. 3A-3C, the mechanical stopper 124 comprises a non-deforming conductor 324 that rises above the bottom 120D of the cavity 120 and electrically and thermally couples the laser 110 to the slider 100 after the reflow of the solder bumps 122. As shown in FIG. 3A, at least one solder bump 326 is disposed on the non-deforming conductor 324, with under bump metallization (UBM) 328 disposed under the at least one solder bump 326 and the solder bumps 122.

During reflow of solder bumps 122 and 326, FIG. 3B shows that the non-deforming conductor 324 serves as Z-stop for vertical alignment. The solder bump 326 on the non-deforming conductor 324 serves multiple purposes. First, the solder bump 326 reduces friction on the non-deforming conductor 324 during reflow to facilitate lateral alignment in X and Y directions. Second, the solder bump 326 provides electrical connection between the laser 110 and the slider 100 after reflow. Furthermore, the solder bump 326 provides mechanical bonding of the laser 110 to the slider 100 after reflow. After the reflow, FIG. 3C shows that the laser 110 and the slider 100 are aligned both laterally and vertically, and are electrically and thermally coupled, as well as mechanically bonded.

Figure 4A:
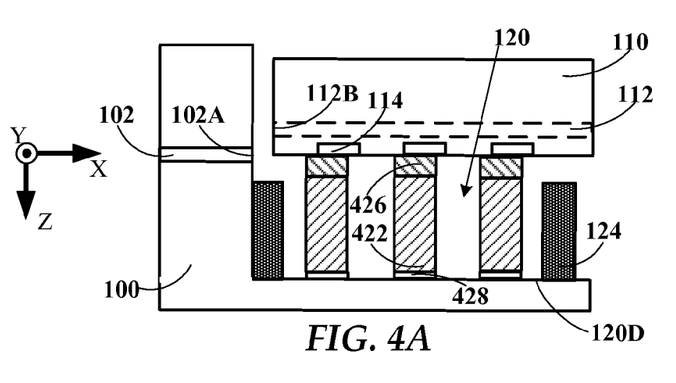
FIGS. 4A-4D are cross-sectional views of a laser and a slider including a waveguide and a cavity configured to align the laser to the waveguide according to various embodiments.

According to another example embodiment, FIGS. 4A-4D are cross-sectional views of four steps of an alignment between a laser 110 and a waveguide 102 on a slider 100. In FIG. 4A, the laser 110 and the waveguide 102 are roughly aligned prior to attach. This step can be achieved, for example, with a pick-and-place machine. As shown in FIGS. 4A-4D, the slider 100 includes a cavity 120. The cavity 120 includes a first plurality 422 of solder bumps on a bottom 120D of the cavity configured to electrically couple the laser 110 to the slider 100. The cavity 120 further includes a second plurality 426 of solder bumps disposed on the first plurality 422 of solder bumps. UBMs 428 are disposed under the first plurality 422 of solder bumps. Depending on solder materials selected, there may or may not be UBMs between the first plurality 422 and second plurality 426 of solder bumps.

According to various embodiments, the second plurality 426 of solder bumps have a lower melting point and smaller thicknesses than the first plurality 422 of solder bumps. A reflow of the second plurality 426 of solder bumps facilitates lateral alignment of an output 112B of the laser 110 to the input facet 102A of the waveguide 102. At least one mechanical stopper 124 is disposed in the cavity 120, wherein the mechanical stopper 124 facilitates vertical alignment of the output 112B of the laser 110 to the input facet 102A of the waveguide 102 in response to a reflow of the first 422 and second 426 plurality of solder bumps.

Figure 4B:
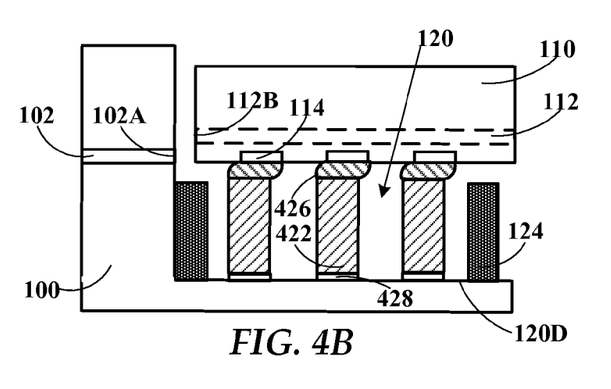
Figure 4C:
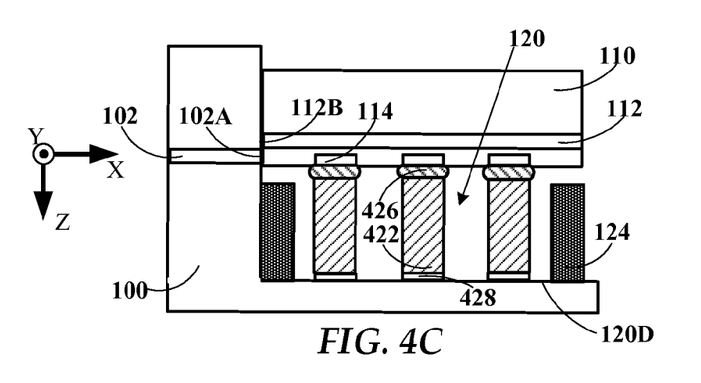

In FIGS. 4B and 4C, a reflow of the second plurality 426 of solder bumps facilitates lateral alignment of an output 112B of the laser 110 to the waveguide input facet 102A, without a reflow of the first plurality 422 of solder bumps. In FIG. 4B, the slider is heated to the lower melting point of the second plurality 426 of solder bumps. Then the second plurality 426 of solder bumps, instead of the first plurality 422 of solder bumps, are reflowed. Once the second plurality 426 of solder bumps have melted, surface tension forces will set lateral alignment as shown in FIG. 4C. Because the second plurality 426 of solder bumps is thin, the laser 110 will not settle onto the mechanical stopper 124. As illustrated in FIG. 4C, the laser 110 has been laterally aligned with the waveguide 102, after the reflow of the second plurality 426 of solder bumps.

Figure 4D:
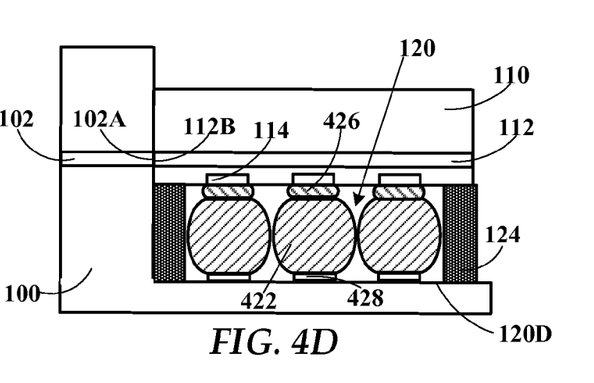

In FIG. 4D, a vertical alignment between the laser 110 and the waveguide 102 is achieved after a reflow of the first plurality 422 of solder bumps. The slider is heated up to the higher melting point of the first plurality 422 of solder bumps, which causes the reflow of the first plurality 422 of solder bumps. In response to the reflow, a surface tension of at least the first plurality 422 of solder bumps vertically brings the laser 110 to contact the at least one mechanical stopper 124, which facilitates vertical alignment of the output 112B of the laser 110 to the waveguide input facet 102A. According to various embodiments, the laser 110 is aligned with the waveguide 102 using passive alignment, without turning on the laser.

Figure 5:
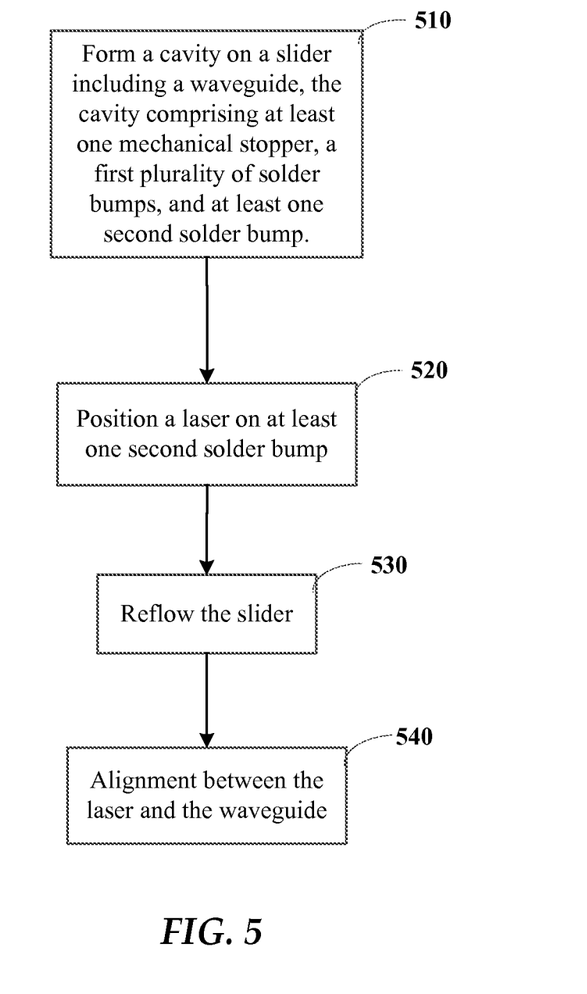
FIG. 5 illustrates various processes for aligning a laser to a waveguide on a slider in accordance with various embodiments.

FIG. 5 illustrates various processes for aligning 540 a laser to a waveguide on a slider in accordance with various embodiments. The method illustrated in FIG. 5 involves forming 510 a cavity on a slider including a waveguide. The cavity comprises at least one mechanical stopper, a first plurality of solder bumps, and at least one second solder bump. The method in FIG. 5 further involves positioning 520 a laser on the at least second solder bump, and reflowing 530 the slider. The first plurality of solder bumps facilitates a vertical alignment between the cavity and the laser during the reflow, and the second solder bump facilitates a lateral alignment between the cavity and the laser during the reflow.

Figure 6:
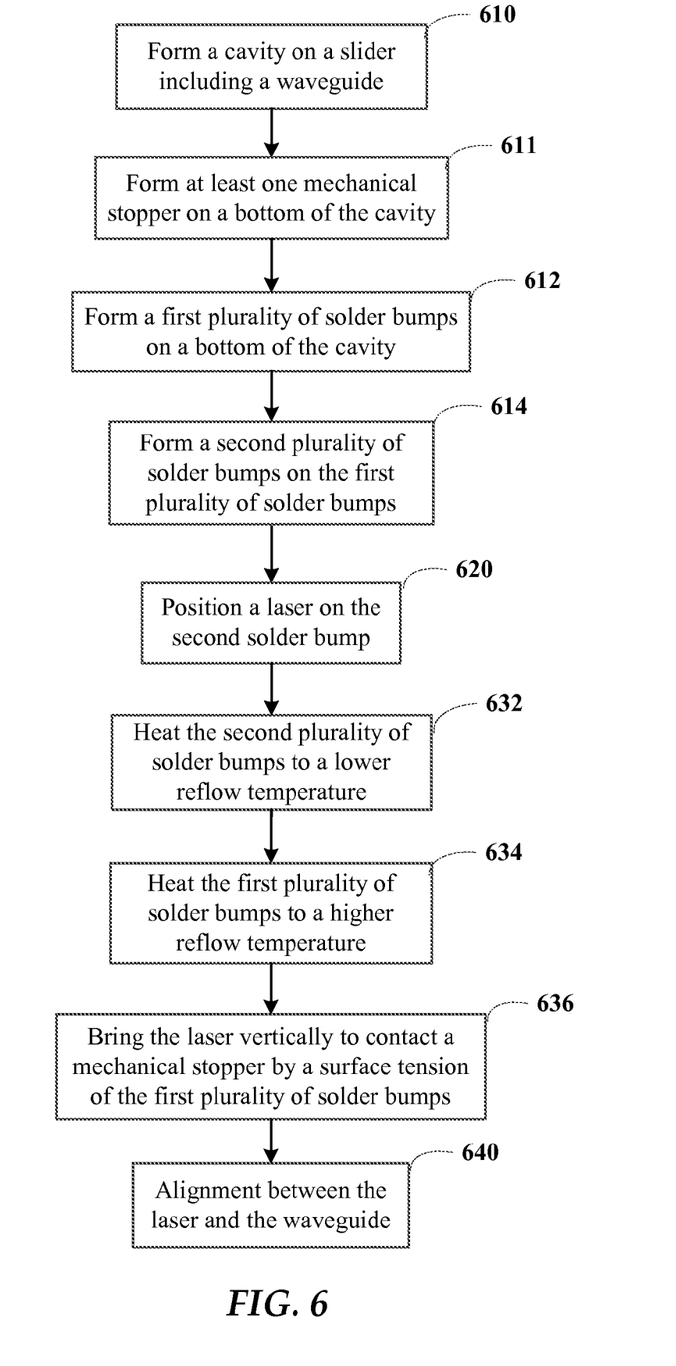
FIGS. 6-7 show various processes for aligning a laser to a waveguide on a slider in accordance with other embodiments.

FIG. 6 shows various processes for aligning 640 a laser to a waveguide on a slider in accordance with other embodiments. According to the embodiment shown in FIG. 6, after forming 610 a cavity on a slider including a waveguide, the process involves forming 611 at least one mechanical stopper and forming 612 a first plurality of solder bumps on a bottom of the cavity, and forming 614 a second plurality of solder bumps on the first plurality of solder bumps. The process further involves positioning 620 a laser on a second solder bump, wherein the second solder bump comprises the second plurality of solder bumps having a lower reflow temperature than the first plurality of solder bumps. According to various embodiments, the second plurality of solder bumps has smaller thicknesses and a lower melting point than the first plurality of solder bumps. According to various embodiments, the first and second pluralities of solder bumps are configured to electrically and thermally couple the laser to the slider. According to various embodiments, the waveguide is disposed at an edge of the cavity.

The method illustrated in FIG. 6 further involves heating 632 the second plurality of solder bumps to a lower reflow temperature, and heating 634 the first plurality of solder bumps to a higher reflow temperature. A reflow of the second plurality of solder bumps facilitates to laterally align the laser to the waveguide, and a reflow of the first plurality of solder bumps facilitates to vertically align the laser to the waveguide. According to various embodiments, the process further involves bringing 636 vertically the laser to contact a mechanical stopper by a surface tension of the first plurality of solder bumps, during the reflow.

Figure 7:
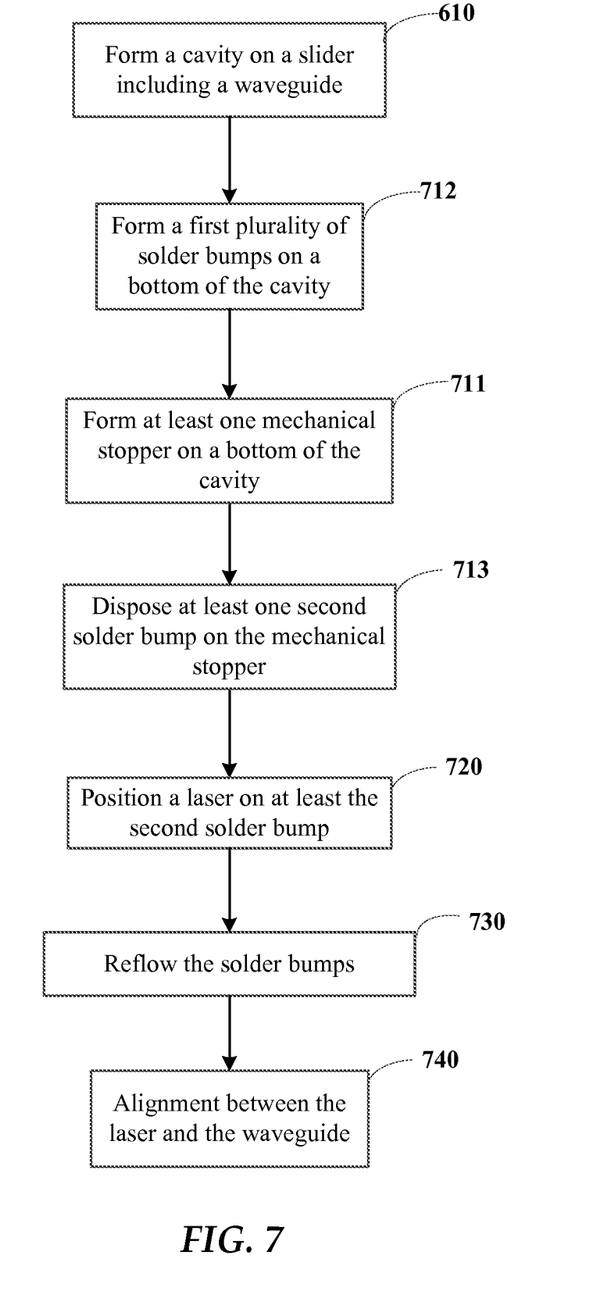

In accordance with other embodiments, FIG. 7 shows various processes for passively aligning 740 a laser to a waveguide on a slider. As shown in FIG. 7, after forming 610 a cavity on a slider including a waveguide, the process involves forming 712 a first plurality of solder bumps on a bottom of the cavity, and forming 711 at least one mechanical stopper on a bottom of the cavity. Then, the process further involves disposing 713 at least one second solder bump on the mechanical stopper. According to various embodiments, the mechanical stopper comprises at least one member that does not electrically couple the laser to the slider after the reflow. According to various embodiments, the mechanical stopper comprises a non-deforming conductor that rises above a bottom of the cavity and electrically and thermally couples the laser to the slider after the reflow. The method illustrated in FIG. 7 further involves positioning 720 a laser on the at least second solder bump, and reflowing 730 the solder bumps on the slider.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
forming a cavity on a slider including a waveguide, wherein the cavity comprises at least one mechanical stopper, at least one under bump metallization layer disposed on the at least one mechanical stopper, a first plurality of solder bumps, and at least one second solder bump disposed on the at least one under bump metallization layer;
positioning a laser on at least the second solder bump; and
reflowing the slider to align an output of the laser to an input of the waveguide, wherein the first plurality of solder bumps facilitates a vertical alignment between the cavity and the laser during the reflow, and wherein the second solder bump facilitates a lateral alignment between the cavity and the laser during the reflow.

2. The method of claim 1, wherein the waveguide is disposed at an edge of the cavity.

3. The method of claim 1, wherein the mechanical stopper comprises at least one member that does not electrically couple the laser to the slider after the reflow.

4. The method of claim 1, wherein the mechanical stopper comprises a non-deforming conductor that rises above a bottom of the cavity and electrically and thermally couples the laser to the slider after the reflow.

5. The method of claim 1, wherein the at least one second solder bump is configured to reduce friction between the laser and the mechanical stopper during the reflow.

6. The method of claim 1, wherein the laser is aligned with the waveguide using passive alignment.

7. The method of claim 1, wherein a surface tension of the plurality of solder bumps further provides lateral alignment between an output of the laser and an input of the waveguide in response to the reflow.

8. A method comprising:
forming a cavity on a slider including a waveguide, wherein the cavity comprises at least one mechanical stopper, a first plurality of solder bumps on a bottom of the cavity, and a second plurality of solder bumps on the first plurality of solder bumps, the second plurality of solder bumps having a lower reflow temperature than the first plurality of solder bumps;

positioning a laser on at least the second plurality of solder bumps; and reflowing the slider to align an output of the laser to an input of the waveguide, the at least one mechanical stopper facilitating a vertical alignment between the cavity and the laser during the reflow, and reflow of the second solder bumps facilitating a lateral alignment between the cavity and the laser during the reflow.

9. The method of claim 8, wherein the first and second pluralities of solder bumps are configured to electrically and thermally couple the laser to the slider.

10. The method of claim 8, wherein the second plurality of solder bumps have smaller thicknesses and a lower melting point than the first plurality of solder bumps.

11. The method of claim 8, wherein a surface tension of the first plurality of solder bumps vertically brings the laser to contact the mechanical stopper during the reflow.

12. The method of claim 11, wherein reflowing the slider comprises:

heating the second plurality of solder bumps to the lower reflow temperature to laterally align the laser to the waveguide; and heating the first plurality of solder bumps to a higher reflow temperature to vertically align the laser to the waveguide.

13. The method of claim 8, wherein the mechanical stopper comprises at least one member that does not electrically couple the laser to the slider after the reflow.

14. The method of claim 8, wherein the mechanical stopper comprises a non-deforming conductor that rises above a bottom of the cavity and electrically and thermally couples the laser to the slider after the reflow.

15. The method of claim 8, wherein at least one of the first and second pluralities of solder bumps are configured to reduce friction between the laser and the mechanical stopper during the reflow.

16. The method of claim 8, wherein the waveguide is disposed at an edge of the cavity.

17. The method of claim 8, wherein the first plurality of solder bumps are disposed on an under bump metallization at the bottom of the cavity.

* * * * *